US007227576B2

(12) United States Patent
Umeyama

(10) Patent No.: US 7,227,576 B2
(45) Date of Patent: Jun. 5, 2007

(54) ELECTRONIC CAMERA

(75) Inventor: Kazuya Umeyama, Edogawa-ku (JP)

(73) Assignee: Nikon Corporation, Tokyo (JP)

( * ) Notice: Subject to any disclaimer, the term of this patent is extended or adjusted under 35 U.S.C. 154(b) by 1106 days.

(21) Appl. No.: 09/935,636

(22) Filed: Aug. 24, 2001

(65) Prior Publication Data

US 2002/0057473 A1 May 16, 2002

(30) Foreign Application Priority Data

Aug. 25, 2000 (JP) .............................. 2000-255699

(51) Int. Cl.
*H04N 5/222* (2006.01)
*G09G 5/02* (2006.01)

(52) U.S. Cl. ........................... 348/333.11; 348/333.05; 345/698

(58) Field of Classification Search ........... 348/333.05, 348/333.11, 353, 328, 698; 345/698; 715/723
See application file for complete search history.

(56) References Cited

U.S. PATENT DOCUMENTS

| 4,821,121 | A | 4/1989 | Beaulier | |
|---|---|---|---|---|
| 5,164,831 | A | 11/1992 | Kuchta et al. | |
| 5,724,579 | A | 3/1998 | Suzuki | |
| 6,215,523 | B1* | 4/2001 | Anderson | 348/333.05 |
| 6,292,218 | B1 | 9/2001 | Parulski et al. | |
| 6,313,877 | B1* | 11/2001 | Anderson | 348/333.05 |
| 6,424,385 | B1 | 7/2002 | Koyama et al. | |
| 6,445,412 | B1* | 9/2002 | Shiohara | 348/333.05 |
| 6,542,192 | B2 | 4/2003 | Akiyama et al. | |
| 6,734,909 | B1* | 5/2004 | Terane et al. | 348/333.05 |

FOREIGN PATENT DOCUMENTS

| JP | A 63-148777 | 6/1988 |
|---|---|---|
| JP | A 63-182777 | 7/1988 |
| JP | A 02-105679 | 4/1990 |
| JP | A 02-285879 | 11/1990 |
| JP | A 04-287286 | 10/1992 |
| JP | A 04-506144 | 10/1992 |
| JP | A 05-012392 | 1/1993 |
| JP | A 05-056378 | 3/1993 |
| JP | A 05-290548 | 11/1993 |
| JP | A 06-236406 | 8/1994 |
| JP | A 07-056942 | 3/1995 |
| JP | A 07-131784 | 5/1995 |
| WO | WO 91/14334 | 9/1991 |

* cited by examiner

*Primary Examiner*—Lin Ye
(74) *Attorney, Agent, or Firm*—Oliff & Berridge, PLC

(57) ABSTRACT

An electronic camera comprises: an image-capturing device that captures an image of a subject and generates first image data; a display device that displays an image; a display image generating device that generates second image data, which have a smaller number of pixels than the first image data and correspond to a display resolution at the display device, based upon the first image data; a recording device that records the first image data and the second image data into a recording medium; and a control device that first reads the second image data when reading the first data from the recording medium and displays on the display device an image based upon the second image data which have been read.

12 Claims, 10 Drawing Sheets

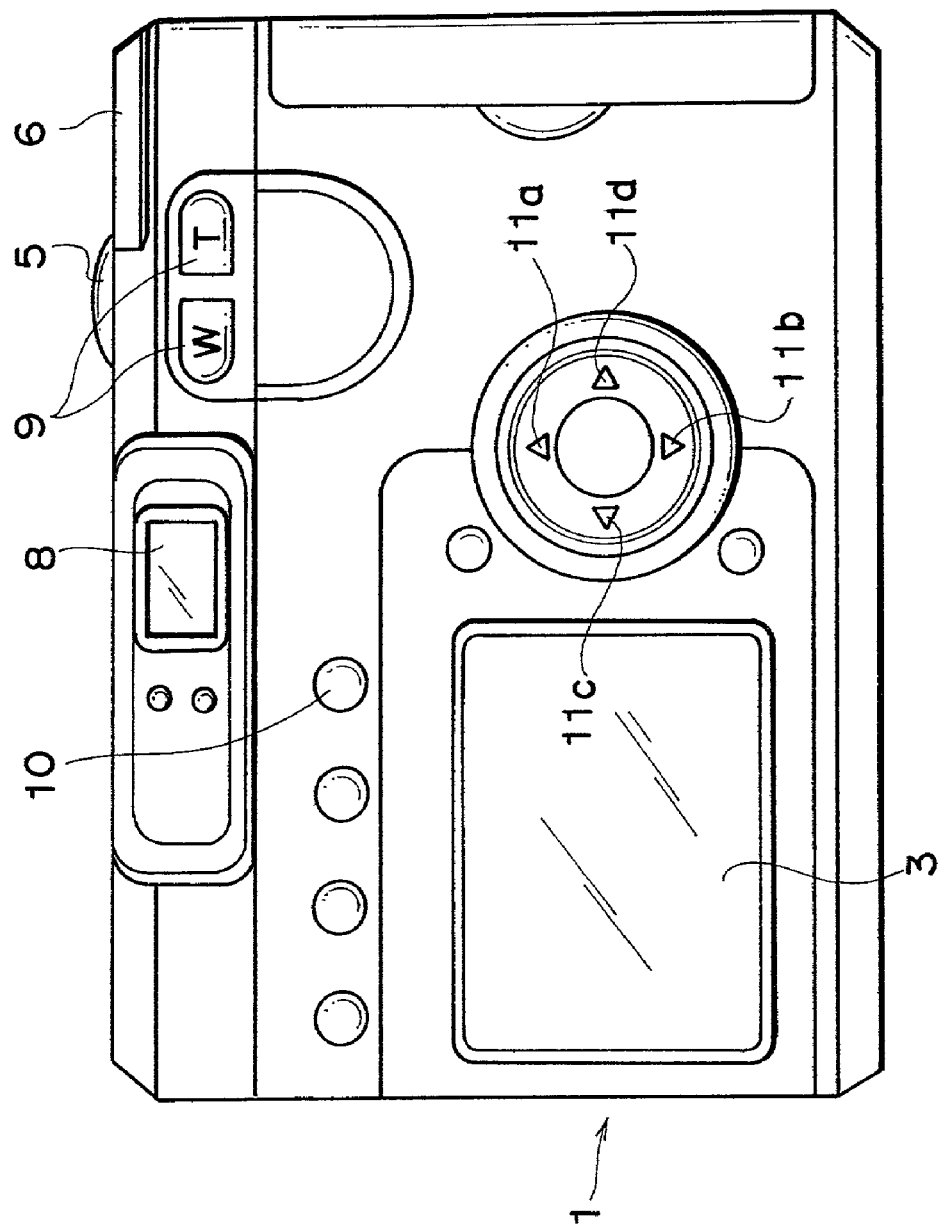

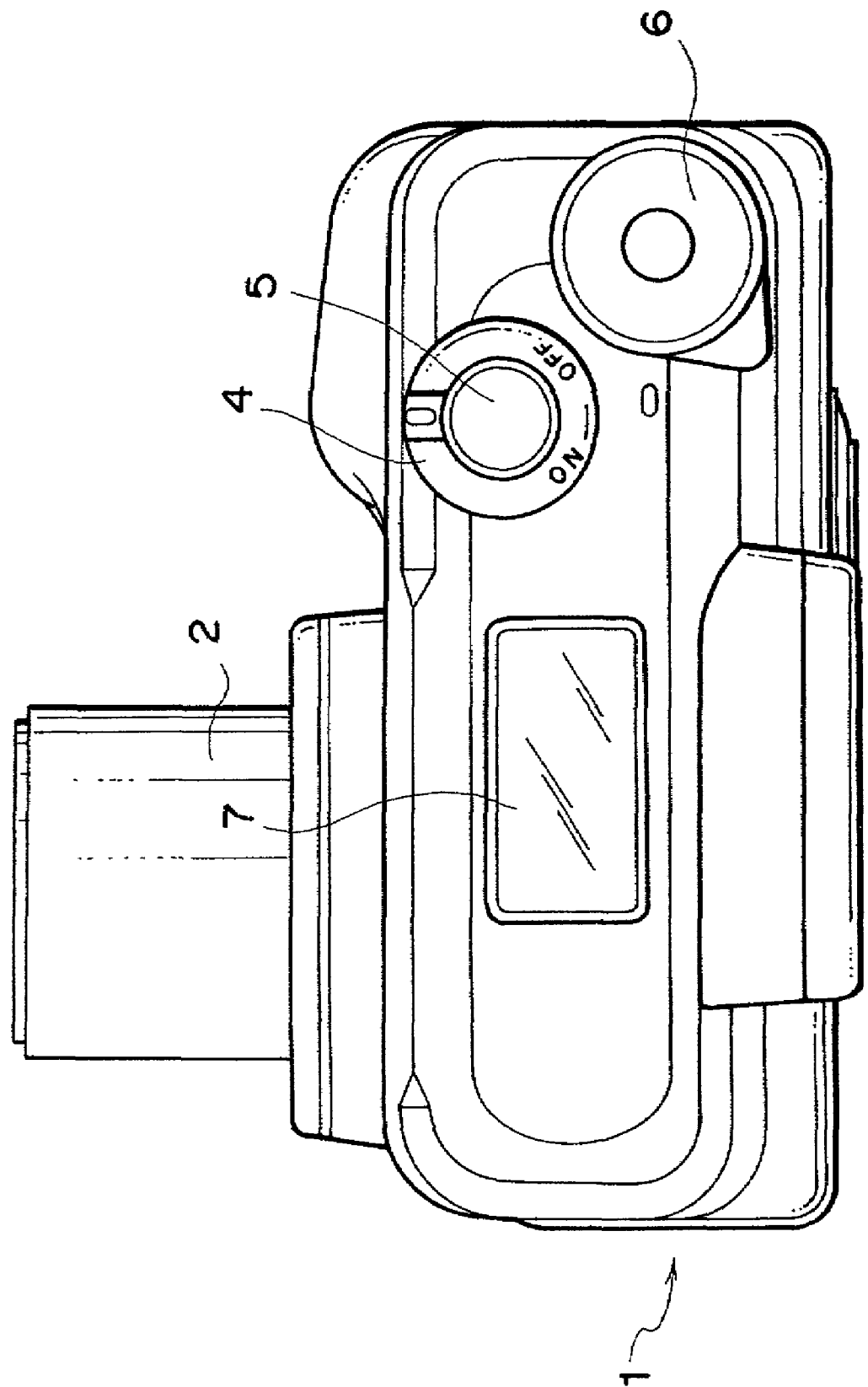

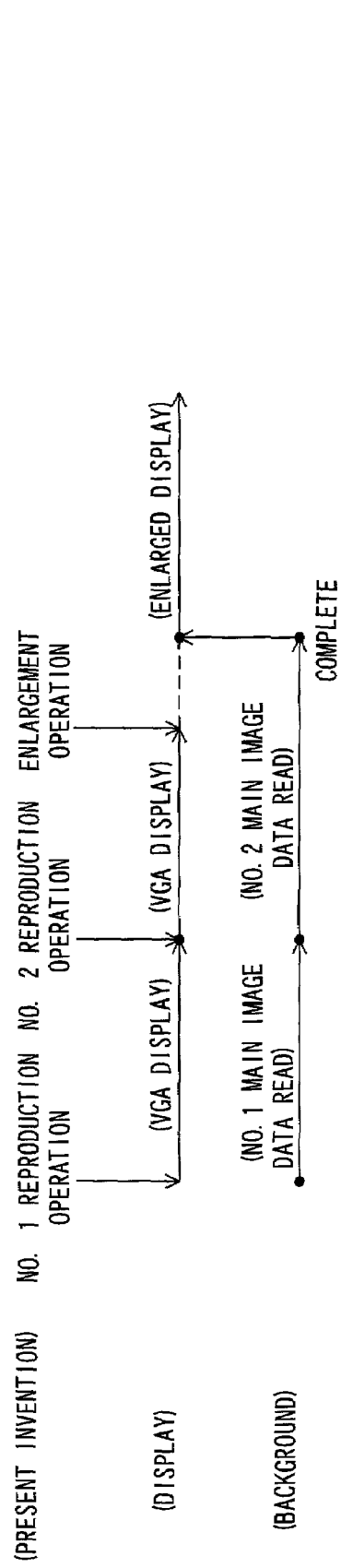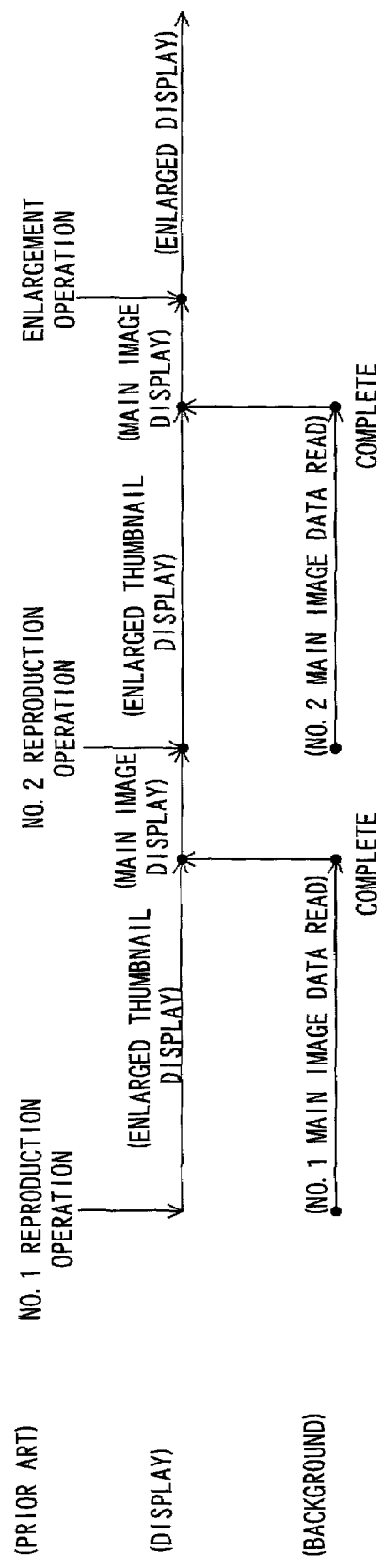

ELECTRONIC CAMERA

INCORPORATION REFERENCE

The disclosure of the following priority application is herein incorporated by reference. Japanese Patent Application No. 2000-255699 filed Aug. 25, 2000.

BACKGROUND OF THE INVENTION

1. Field of the Invention

The present invention relates to an electronic camera that captures an image of a subject by utilizing an image-capturing device such as a CCD.

2. Description of Related Art

In an electronic camera that captures an image of a subject and records the captured image by utilizing a CCD image-capturing element, an image signal output from the CCD image-capturing element undergoes specific types of image processing such as white balance adjustment and the image data having undergone the processing are recorded at a recording medium such as a memory card loaded in the electronic camera. Such an electronic camera in the prior art is usually provided with an image display monitor on which the subject being captured by the CCD image-capturing element is displayed in a photographing mode (recording mode) which constitutes a photographing-enabled state and an image recorded at the recording medium is reproduced and displayed in a reproduction mode enabling display of an image that has already been photographed.

When a subject is photographed, an image constituted of fewer pixels (an image constituted of a smaller number of pixels than the number of pixels at the display monitor) referred to as a thumbnail image which is obtained by implementing subsampling (culling or thinning out) processing on the image data mentioned above (hereafter referred to as the main image) is created concurrently while generating the main image, and the thumbnail image is recorded together with the main image into the recording medium. During a reproduction operation, thumbnail images are first read from the recording medium and are displayed in a group at the display monitor. For instance, the screen of the display monitor is split into 3×3=9 display areas and thumbnail images assigned with image frame numbers 1~9 are displayed in the nine areas. If there are 10 or more image files in the image folder, the thumbnail images in the tenth frame and subsequent frames are displayed by operating a frame feed operating button at the camera. In response to a reproduction display operation performed to select one of the thumbnail images displayed in an array to display the chosen image at the display monitor the main image corresponding to the selected thumbnail image is called up from the recording medium and is displayed at the display monitor.

The number of pixels provided at CCD image-capturing elements has increased to several millions in recent years and, as a result, the data volume of a main image photographed at the highest image quality setting amounts to as much as 8~10 MB. Thus, it takes 10 seconds or longer to call up the main image after selecting the image in the group display. For this reason, in an electronic camera in the prior art, once an image is selected, its thumbnail image, with the smaller number of pixels is first displayed in an enlargement at the display monitor, and then the display monitor is switched to main image display when the main image access is completed.

However, since the thumbnail image constituted of a smaller number of pixels than the number of pixels at the display monitor is displayed in an enlargement during the enlarged thumbnail display, the image displayed at the display monitor at this time is coarse. While the user is allowed to engage in another operation such as an operation to call up another image even during the enlarged thumbnail image display, the user tends to delay the operation until a fine, natural-looking image, i.e., the main image is displayed since the thumbnail image on the monitor display is coarse and looks unnatural. Thus, a problem arises in that the operability is compromised due to a considerable length of time elapsing during image display.

SUMMARY OF THE INVENTION

An object of the present invention is to provide an electronic camera achieving outstanding reproduction display operability by displaying an image constituted of pixels, the number of which equals the number of pixels at the display monitor during a main image read.

In order to attain the above object, an electronic camera according to the present invention comprises: an image-capturing device that captures an image of a subject and generates first image data; a display device that displays an image; a display image generating device that generates second image data, which have a smaller number of pixels than the first image data and correspond to a display resolution at the display device, based upon the first image data; a recording device that records the first image data and the second image data into a recording medium; and a control device that first reads the second image data when reading the first data from the recording medium and displays on the display device an image based upon the second image data which have been read.

In this electronic camera, it is preferred that a reproduction instruction device that issues an instruction to reproduce an image based upon image data recorded in the recording medium is further provided, and the control device starts reading the second image data and the first image data recorded in the recording medium in response to a reproduction instruction issued by the reproduction instruction device.

Also, it is preferred that the a recording device records the first image data and the second image data in a single image file in the recording medium.

Also, it is preferred that the control device sustains display of the image based upon the second image data at the display device even after the read of the first image has been completed.

Also, it is preferred that: a thumbnail image generating device that generates thumbnail image data, which have a smaller number of pixels than the second image data, based upon the first image data, is further provided; and the recording device records the first image data, the second image data and the thumbnail image data into the recording medium. In this case, it is preferred that the control device displays a plurality of thumbnail images at the display device by reading a plurality of sets of thumbnail image data recorded in the recording medium, reads second image data before reading first image data corresponding to a thumbnail image selected from the plurality of thumbnail images on display and displays the second image data at the display device.

Also, it is preferred that: an enlargement instruction device that issues an instruction for enlarged display of an image reproduced and displayed at the display device is further provided; and the control device invalidates the instruction for enlarged display of the reproduced and displayed image issued by the enlargement instruction device while reading the first image data is in progress.

An image processing apparatus according to the present invention comprises: an image-capturing device that captures an image of a subject and generates first image data; a display device that displays an image; a display image generating device that generates second image data, which have a smaller number of pixels than the first image data and correspond to a display resolution at the display device, based upon the first image data; a recording device that records the first image data and the second image data into a recording medium; and a control device that first reads the second image data when reading the first data from the recording medium and displays on the display device an image based upon the second image data which have been read.

An image reproduction method according to the present invention comprises: a step in which first image data are generated by engaging an image-capturing device to capture an image of a subject; a step in which second image data, which have a smaller number of pixels than the first image data and correspond to a display resolution at a display device, are generated based upon the first image data; a step in which the first image data and the second image data are recorded into a recording medium; and a step in which the second image data are first read when reading the first image data from the recording medium and an image based upon the second image data that have been read is displayed at the display device.

An image data recording method according to the present invention comprises: a step in which first image data are generated by engaging an image-capturing device to capture an image of a subject; a step in which second image data, which have a smaller number of pixels than the first image data and correspond to a display resolution at a display device, are generated based upon the first image data; and a step in which the first image data and the second image data are recorded into a recording medium.

An image reproduction method according to the present invention for reproducing an image by reading image data from a recording medium having recorded therein first image data generated by engaging an image-capturing device to capture an image of a subject and second image data that have a smaller number of pixels than the first image data, correspond to a display resolution at a display device and are generated based upon the first image data, comprises: a step in which the second image data are first read when reading the first image data from the recording medium and an image based upon the second image data that have been read is displayed at the display device.

BRIEF DESCRIPTION OF THE DRAWINGS

FIG. 1B is a rear view of the camera in FIG. 1A taken from behind;

FIG. 1C is a plan view of the camera in FIG. 1A in a state in which the zoom lens has been driven out;

FIG. 7A presents a time chart of the reproduction operation achieved in the present invention;

FIG. 7B presents a time chart of the reproduction operation achieved in the prior art.

DESCRIPTION OF PREFERRED EMBODIMENT

Figure 1A:
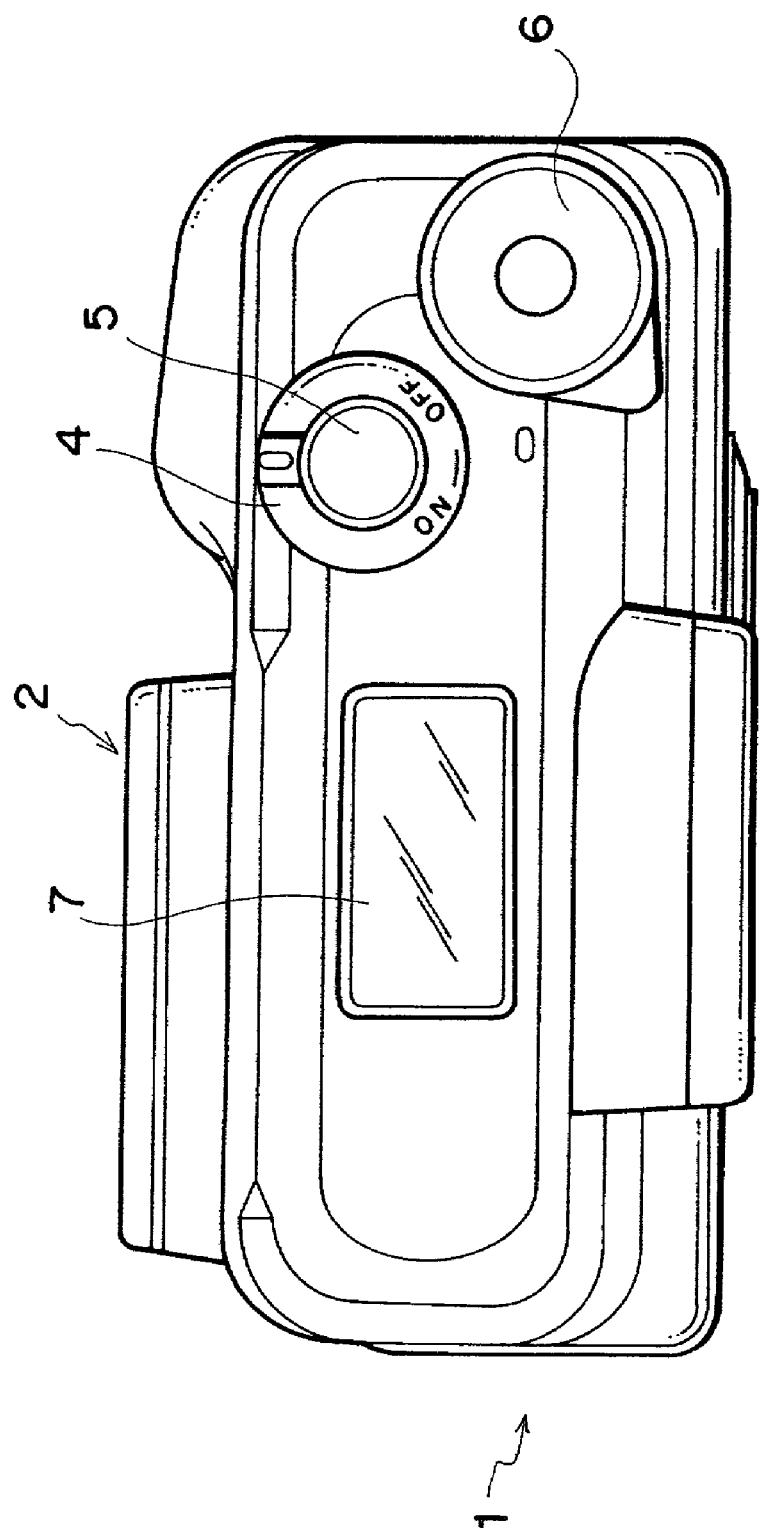
FIG. 1A shows an embodiment of the electronic camera according to the present invention in a plan view taken from above.

The following is an explanation of an embodiment of the present invention, given in reference to FIGS. 1A~7B. FIGS. 1A~1C illustrate an embodiment of the electronic camera according to the present invention, with FIG. 1A presenting a plan view of the camera taken from above, FIG. 1B presenting a rear view of the camera taken from the rear and FIG. 1C presenting a plan view of the camera with its zoom lens driven out. As shown in FIG. 1A, at the upper surface of the electronic camera, a main switch 4 operated to turn on/off the power, a shutter release button 5, a selector dial 6 operated to switch between a photographing mode and a reproduction mode and a display panel 7 at which camera information is displayed are provided. In this context, the photographing mode refers to an operating mode in which a subject image that has been captured is recorded as image data and the reproduction mode refers to an operating mode in which recorded image data are read out and are displayed at a display monitor 3.

In addition, as shown in FIG. 1B, the display monitor 3 for image display, a viewfinder eyepiece window 8, a zoom switching button 9 operated to drive a zoom lens 2 and selector buttons 11a~11d are provided at the camera rear side. The selector buttons 11a~11d may be engaged to select from a menu while a menu screen is on display at the display monitor 3 or to select an image in the reproduction mode. Reference numeral 10 indicates a thumbnail button operated to bring up thumbnail group display in the reproduction mode. If the W side of the zoom switching button 9 is depressed, the zoom lens 2 is driven to the wide angle side, whereas it is driven to the telephoto side when the T side of the zoom switching button 9 is depressed. It is to be noted that the zoom switching button 9 functions as an operating button operated to enlarge a reproduced image in the reproduction mode, with enlarged display of the reproduced image brought up by depressing the T side and the enlarged display cleared by depressing the W side.

Figure 2:
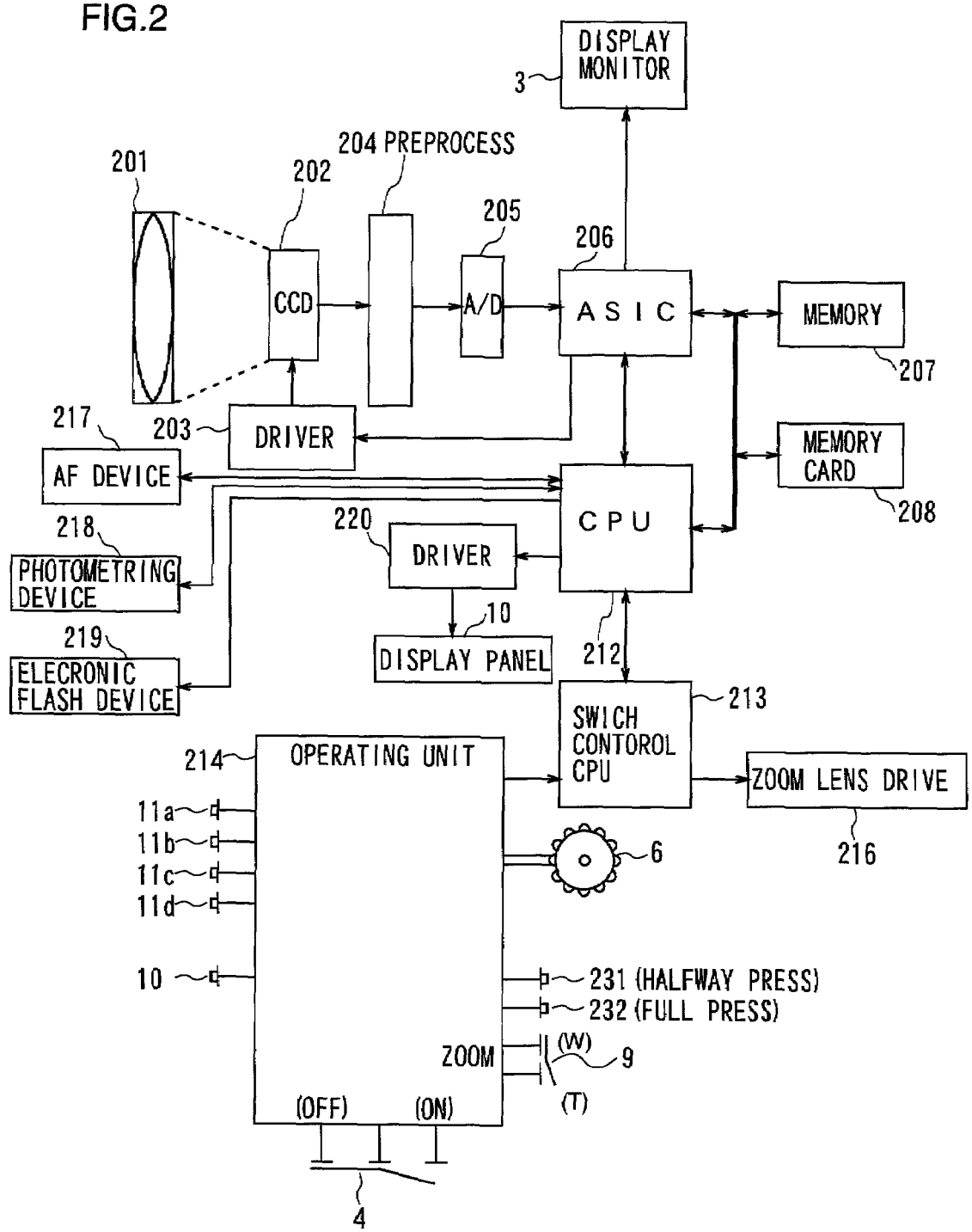
FIG. 2 is a circuit block diagram of the electronic camera 1.

FIG. 2 shows the circuit blocks constituting the electronic camera 1. The electronic camera 1 is controlled by a main CPU 212 that implements control on focal point detection/adjustment processing and photometering processing, an image processing ASIC 206 that implements control on image processing and image display processing and a switch control CPU 213 that controls signals input through individual switches. When the individual switches at an operating unit 214 of the electronic camera 1 have been operated, the switch control CPU 213 sends information indicating that the switches have been operated to the CPU 212, and it also implements control on a zoom lens drive device 216 to drive the zoom lens 2 in response to an operation of the zoom switching button 9.

To the rear of the zoom lens 2, an image-capturing element 202 which may be constituted of a CCD, a CMOS image sensor or the like is provided, and an image of subject light having entered the zoom lens 2 is formed at the image-capturing surface of the image-capturing element 202. The drive of the image-capturing element 202 is controlled by the ASIC 206 via a driver circuit 203 so as to achieve control on its operating timing in coordination with the operating timing of a preprocess circuit 204 and an A/D conversion circuit 205. The preprocess circuit 204 implements analog processing such as gain control and noise removal on an analog signal output from the image-capturing element 202, and includes an AGC circuit and a CDS circuit. The analog signal output from the preprocess circuit 204 is then converted to a digital signal at the A/D conversion circuit 205.

The image preprocessing ASIC 206 primarily engages in the following image processing.

1. Image processing such as contour (or edge) compensation, gamma correction and white balance adjustment on the image data resulting from the digitization at the A/D conversion circuit 205.
2. Creation of a display image to be displayed at the display monitor 3 through subsampling processing (image size compression processing) or the like implemented in correspondence to the display resolution at the display monitor 3 on the image data having undergone the image pre-processing. It is to be noted that while the display resolution normally refers to the number of pixels per inch, the term is used to mean the number of pixels constituting the display image screen in this context. The number of pixels at a standard display monitor is 640×480 pixels (VGA).
3. Further subsampling processing implemented on the display image to prepare a thumbnail image constituted of 160×120 pixels.
4. Compression of the image data in a specific format (e.g., JPEG format).

A buffer memory 207 which temporarily stores in memory the image data, maybe constituted of an SRAM, a VRAM, an SDRAM or the like. Reference numeral 208 indicates a memory card mounted at the electronic camera 1, and in this memory card, compressed or uncompressed image data, display image data and thumbnail image data are stored with a specific type of image information appended thereto. It is to be noted that while the image data are recorded in the memory card 208 in the embodiment, the image data may be recorded and held at a storage element with a large capacity provided in the main body of the electronic camera 1, instead.

An AF device 217, which comprises a light-receiving element for receiving the subject light for focal point detection and a focal adjustment device (not shown), drives the zoom lens 2 to the focus position so as to form an image of the subject light entering the zoom lens 2 onto the image-capturing element 202 based upon focal point detection data detected at the light-receiving element for focal point detection. A photometering device 218 constituted of a light-receiving element (not shown) measures the brightness of the subject over an area in which the focal adjustment state is detected by the AF device 217 mentioned above, for instance. In addition, on the display panel 7 connected to the CPU 212 via a display panel driver circuit 220, the light emission mode setting at an electronic flash unit 219, the number of photographic frames and the like are displayed. A halfway press signal and a full press signal are respectively input to the switch control CPU 213 from a halfway-press switch 231 and a full-press switch 232 that interlock with the shutter release button 5 (see FIG. 1).

It is to be noted that either of two AF operating modes, i.e., a "single AF mode" and a "continuous AF mode," can be selected at the electronic camera 1. In the "single AF mode", a focal point detection operation is performed at the AF device 217 in response to an operation of the halfway-press switch 231 mentioned earlier, and in the "continuous AF mode," a focal point detection/focusing operation is performed at the AF device 217 at all times if the electronic camera 1 is set in the photographing mode.

(Explanation of Photographing Operation)

Figure 3:
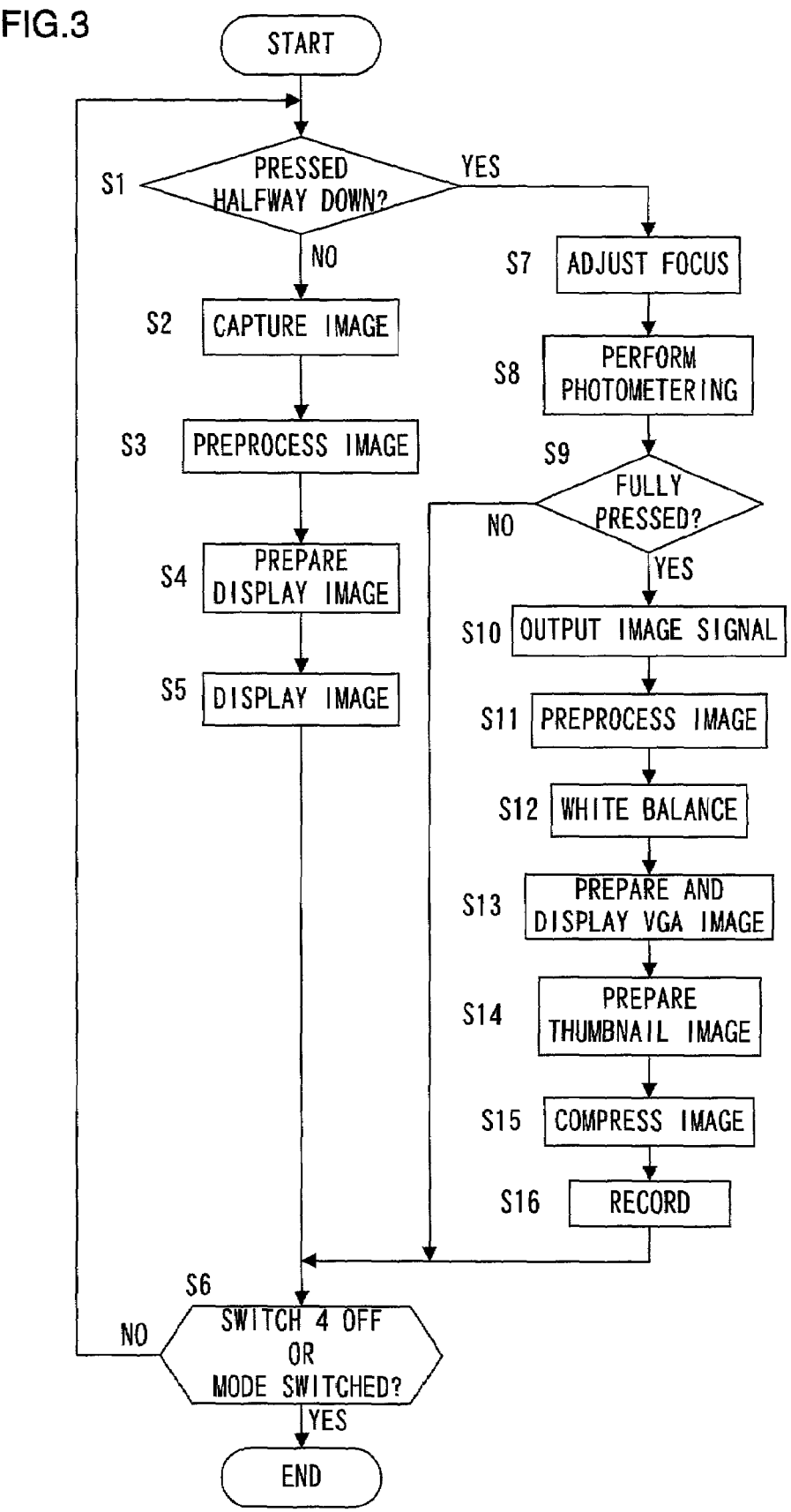
FIG. 3 is a flowchart of the photographing operation processing.

Next, the photographing operation performed in the photographing mode is explained in reference to the flowchart in FIG. 3. The photographing processing in FIG. 3 is executed by the CPU 212 if the selector dial 6 is switched to the photographing mode position while the main switch 4 is in an ON state or if the main switch 4 is turned on while the selector dial 6 is set in the photographing mode. For this processing, the zoom lens 2 is driven out to exit from the state shown in FIG. 1A and enter the state illustrated in FIG. 1C. It is to be noted that the zoom lens 2 thus driven out is set back to the a original state shown in FIG. 1A when the electronic camera 1 is switched to the reproduction mode to be detailed later or when the main switch 4 is turned off.

In step S1, a decision is made as to whether or not the halfway-press switch 231 has been turned on and if a negative decision is made (NO), the operation proceeds to step S2, whereas if an affirmative decision is made (YES), the operation proceeds to step S7. In step S2, a subject image is captured by the image-capturing element 202 and an analog image signal is output from the image-capturing element 202. In step S3, the analog processing and the conversion to a digital signal and the image pre-processing are implemented on the analog image signal respectively by the preprocess circuit 204, the A/D conversion element 205 and the image processing ASIC 206, and the image data having undergone the pre-processing are temporarily stored in the buffer memory 207.

In step S4, the image data are read out from the buffer memory 207 to the image processing ASIC 206 and a display image is created in correspondence to the display resolution at the display monitor 3. In step S5, the display image prepared in step S4 is displayed at the display monitor 3. In the following step S6, a decision is made as to whether or not the main switch 4 has been turned off or whether or not the mode has been switched from the photographing mode to the reproduction mode. If a negative decision is made (NO), the operation of returns to step S1, whereas if an affirmative decision dismayed (YES), the sequence of photographing mode processing ends. The display image displayed at the display monitor 3, which is referred to as a through image, is updated over predetermined intervals based upon the subject light entering the zoom lens 2 by repeatedly executing the processing in steps S1~S6.

If, on the other hand, the shutter release button 5 has been pressed halfway down and thus the halfway-press switch 231 has been determined to be in the ON state, the operation proceeds from step S1 to step S7 to implement the focal adjustment processing by engaging the AF device 217, and then, in step S8, the photometering device 218 performs a photometering operation (measurement of the subject brightness). In step S9, a decision is made as to whether or not the full-press switch 232 has been turned on, and if the shutter release button 5 has been pressed all the way down and thus an affirmative decision is made (YES), the operation proceeds to step S10, whereas if a negative decision is made (NO), the operation proceeds to step S6.

If the operation has proceeded from step S9 to step S10, a photographing operation is performed while controlling the exposure value in conformance the photometering results obtained at the photometering device 218 and the mode setting selected in advance, and the corresponding image signal is output from the image-capturing element 202 to the preprocess circuit 204. In step S11, processing similar to that in step S3 is implemented, and the image data having undergone the pre-processing are temporarily stored in the buffer memory 207. In step S12, a white balance adjustment is performed at the image processing ASIC 206, and the image data having undergone the white balance adjustment are stored in the buffer memory 207 again.

In step S13, the image data stored in the buffer memory 207, are again read into the image processing ASIC 206 which then implements subsampling processing on the image data to prepare a VGA image for display at the display monitor 3 and the VGA image thus created is stored in the buffer memory 207. This VGA image is referred to as a freeze image screen and is displayed at the display monitor 3 as a photographic image screen. In step S14, further subsampling processing is implemented on the VGA image to prepare a thumbnail image constituted of 160×120 pixels and the resulting thumbnail image is stored in the buffer memory 207.

Figure 4:
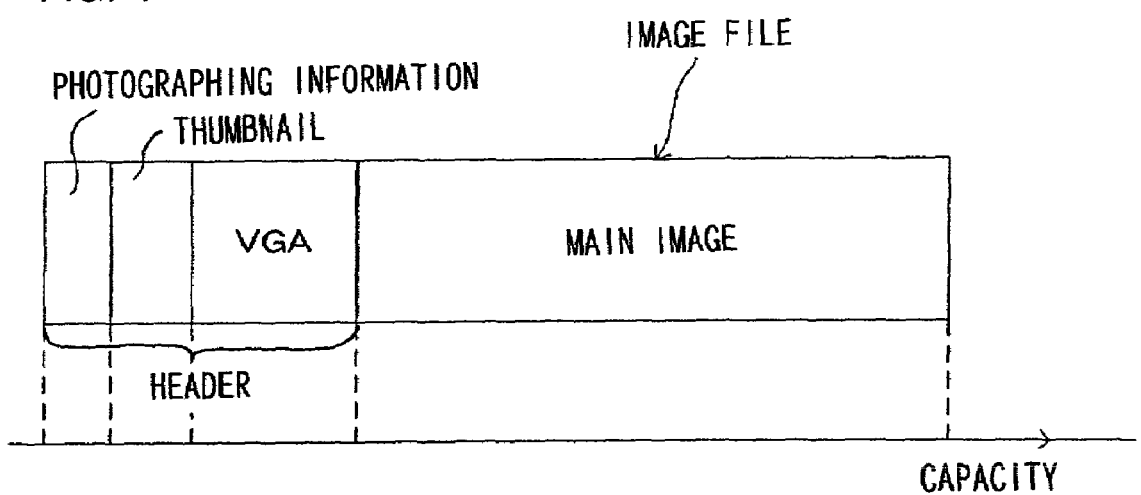
FIG. 4 presents a conceptual diagram of the structure of an image file.

In step S15, image compression processing is implemented on the image data having undergone white balance adjustment. This image, which is referred to as a main image, is recorded into the memory card 208 together with the VGA image data and the thumbnail image data in step S16. In FIG. 4 presenting a conceptual diagram of the structure of an image file, each image file is constituted of header information and main image data. As the header information, the photographing information, the VGA image data and the thumbnail image data are recorded. Once the recording processing in step S16 is completed, the operation proceeds to step S6.

It is to be noted that while the compression processing is implemented when recording the main image data into the memory card 208 in the explanation given above, the main image data may be recorded in the uncompressed form in order to ensure that the quality of the image is not lowered. In addition, the VGA image data and thumbnail image data, too, may be recorded into the memory card 208 after undergoing compression processing. In such a case, the onus on the memory capacity of the memory card 208 can be lessened.

(Explanation of Reproduction Operation)

Next, the reproduction operation performed in the reproduction mode is explained. The electronic camera 1 enters the reproduction mode if the selector dial 6 is switched to the reproduction mode position while the main switch 4 is in an ON state or if the main switch 4 is turned on while the selector dial 6 is set in the reproduction mode. While the image data recorded in the memory card 208 are read and displayed at the display monitor 3 in the reproduction mode, the reproduction mode includes a single frame reproduction mode for displaying image data for one frame at the display monitor 3 and a thumbnail display mode for simultaneously displaying a plurality of frames of image data at the display monitor 3.

Figure 5:
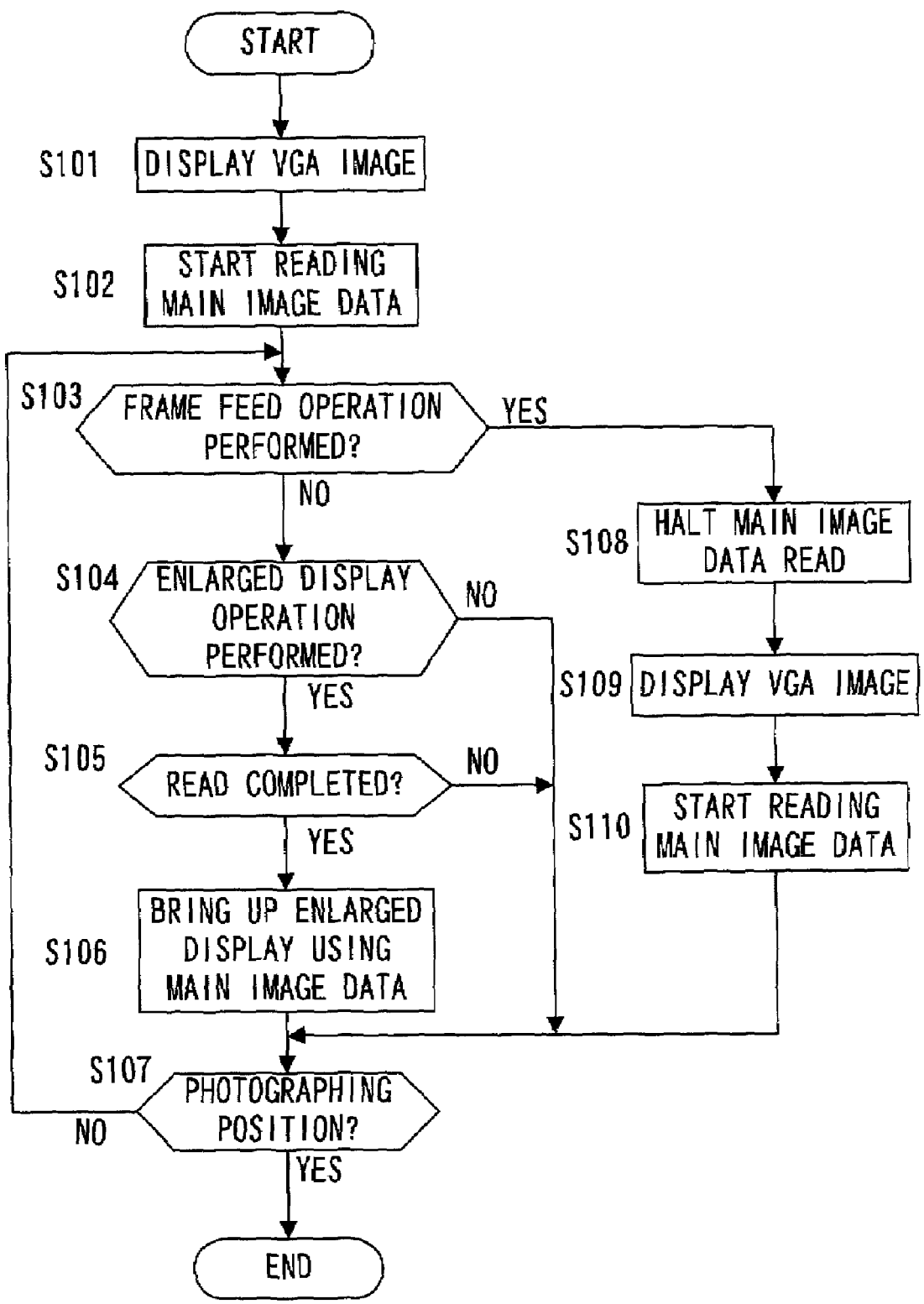
FIG. 5 is a flowchart of the reproduction operation.

First, an example of the operation that maybe performed in the single frame reproduction mode is explained in reference to the flowchart in FIG. 5. FIG. 5 presents a flowchart of the processing implemented to bring up enlarged image display in the single frame reproduction mode. The CPU 212 executes the processing in FIG. 5 if the selector dial 6 is set to the reproduction position. In step S101, the VGA image data recorded in the memory card 208 are read out to the buffer memory 207 and the VGA image is displayed at the display monitor 3 by the image processing ASIC 206. At this time, the VGA image corresponding to the newest image obtained through the most recent photographing operation is read out. It is to be noted that if the VGA image data in the memory card 208 have been compressed, the image processing ASIC 206 implements decompression processing on the image data.

In step S102, a read of the newest set of image data recorded in the memory card 208, i.e., the main image data corresponding to the image obtained through the most recent photographing operation, which are the main image data corresponding to the VGA image currently displayed at the display monitor 3, into the buffer memory 207 starts. Instep S103, a decision is made as to whether or not a frame feed operation has been performed in response to an operation of the selector button 11c or 11d and if a negative decision is made (NO), the operation proceeds to step S104, whereas if an affirmative decision is made (YES), the operation proceeds to step S108.

The processing implemented when the operation proceeds from step S103 to step S104 is first explained. In step S104, a decision is made as to whether or not the zoom switching button 9 has been depressed on the T side and an operation to display the display image in an enlargement has been performed, and if an affirmative decision is made (YES), the operation proceeds to step S105, whereas if a negative decision is made (NO), the operation proceeds to step S107. In step S105, a decision is made as to whether or not the read of the main image data started in step S102 has been completed, and if an affirmative decision is made (YES), the operation proceeds to step S106 to display an enlarged image at the display monitor 3 by using the main image data before the operation proceeds to step S107. If, on the other hand, a negative decision is made (NO) in step S105, the operation skips step S106 and proceeds to step S107. In step S107, a decision is made as to whether or not the selector dial 6 has been set to the photographing position, and if a negative decision is made (NO), the operation returns to step S103, whereas if an affirmative decision as made (YES), the reproduction operation ends.

If, on the other hand, the operation proceeds from step S103 to step S108, the main image data read started in step S102 is halted. In step S109, VGA image data of an image selected through a frame feed operation are read out from the memory card 208 into the buffer memory 207 and the VGA image is displayed by the image processing ASIC 206 at the display monitor 3. Next, in step S110, a read of the main image data corresponding to the selected image into the buffer memory 207 starts, and then the operation proceeds to step S107.

Figure 6A:
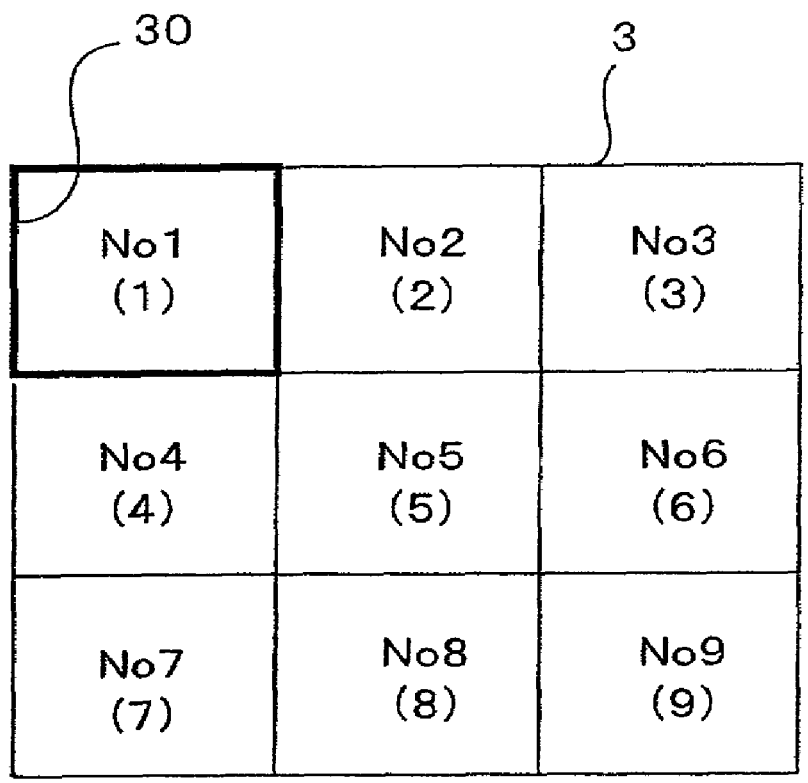
FIG. 6A is provided to facilitate an explanation of a display mode at the display monitor 3, illustrating the thumbnail group display.

Next, the reproduction operation performed in the thumbnail display mode is explained. When the thumbnail button 10 is operated in the reproduction mode, a group of thumbnail images is displayed at the display monitor as shown in FIG. 6A. In the example presented in FIG. 6A, the display area that the display monitor is split into 9 (3×3) areas, and thumbnail images assigned with image numbers 1~9 which are recorded in the memory card 208 are displayed in the areas (1)~(9). Reference numeral 30 indicates an image selection frame, which can be moved along the vertical direction and the horizontal direction by operating the selector buttons 11*a*~11*d* in FIG. 1B.

Figure 6B:
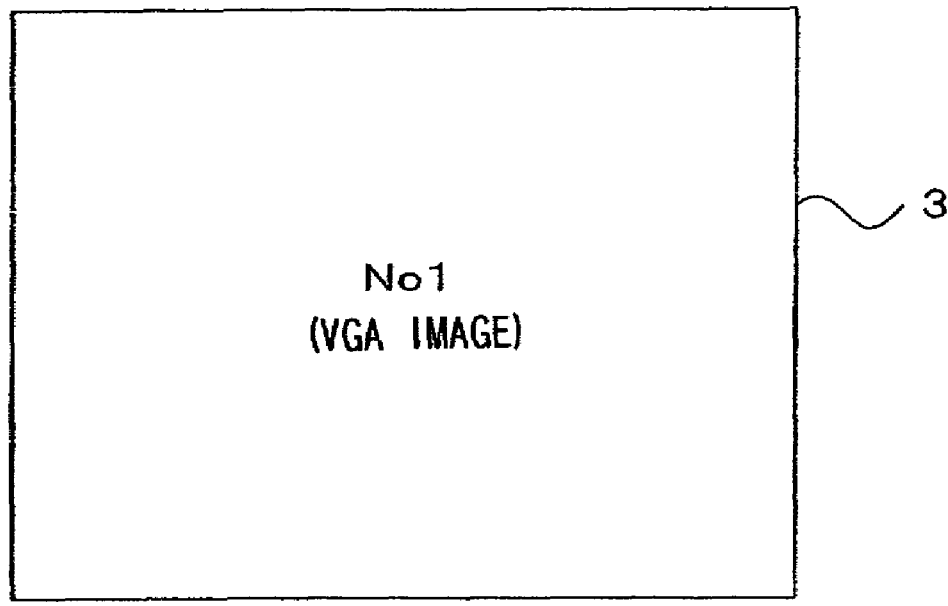
FIG. 6B shows a single-frame display of a VGA image corresponding to one of the thumbnails in FIG. 6A.

If the thumbnail button 10 is operated again while the image selection frame 30 is set at the thumbnail images No. 1 as shown in FIG. 6A, the VGA image of the image No. 1 is displayed at the display monitor 3 as shown in FIG. 6B. Since this display operation is similar to that executed in step S101 in FIG. 5 and the subsequent enlargement operation is similar to that executed in the single frame display mode, their explanation is omitted. It is to be noted that the frame feed operation with regard to which a decision is made in step S103 in FIG. 5 constitutes the following series of operations in the thumbnail display mode. Namely, the single frame display state is exited to enter the thumbnail group display state by operating the thumbnail button 10, the selector buttons 11*c* and 11*d* are operated to move the image selection frame 30 to the position of the image to be selected and then the thumbnail button 10 is operated again to issue an instruction to bring up single frame display of the selected image.

As explained above, the VGA image is first displayed at the display monitor 3 and the main image data corresponding to the VGA image on display are read while the VGA image display is on, when implementing single frame display at the display monitor 3. Then, in response to an enlarged display operation, enlarged display is brought up by using the main image data that have been read during the VGA image display. It is to be noted that if the main image data read has not been completed yet when the enlarged display operation is executed, a mark indicating that a data read is in progress is brought up on the display monitor 3. Any operation requiring the main image data is disallowed while the mark is on display.

As explained above, since VGA image data corresponding to the display resolution at the display monitor 3 are recorded in the memory card 208 when recording a photographic image and this VGA image is displayed during a single frame reproduction display in this embodiment, the quality of the image is clearly improved over the enlarged display of a thumbnail image implemented in the prior art giving the impression as if the main image were on display. As a result, the frame feed operation is performed without waiting for the main image read to be completed, to achieve a continuous display operation with a high degree of efficiency. In addition, during a slide show or the like that does not require enlarged display, faster processing can be achieved without reading the main image.

FIGS. 7A and 7B each present a time chart of a display operation for two frames executed to bring up enlarged display of the image in the second frame, with FIG. 7A showing the time chart corresponding to the present invention and FIG. 7B showing a time chart of the operation achieved in an electronic camera in the prior art to afford a comparison between them. As shown in FIG. 7B, the enlarged thumbnail display is first brought up in response to a reproduction operation and the display is switched to the image display based upon the main image data when the main image data read is completed in the prior art. Since a thumbnail image is constituted of a smaller number of pixels than the number of pixels at the display monitor 3, the enlarged thumbnail image on display becomes rather coarse. This results in a tendency in which the user lets a considerable length of time elapse without performing the next operation (frame feed or enlarged display) until a finer main image is brought up on display. It is to be noted that when displaying an image using the main image data, the main image data are subsampled in correspondence to the resolution (VGA) at the display monitor 3 and a VGA image prepared based upon the data resulting from the subsampling processing is displayed.

However, a finer VGA image is displayed through the reproduction operation as illustrated in FIG. 7A in the embodiment. Since the volume of compressed data of a VGA image is only approximately 64 kb, the data can be read from the memory card 208 within a greatly reduced length of time compared to the length of time required to read main image data, the volume of which may be as much as 10 MB. Thus, the VGA image can be displayed promptly as the reproduction operation is executed and the image on display achieves a quality equivalent to the quality of an image displayed by using the main image data. This creates an impression as if the image were displayed using the main image data to prompt the user to perform a frame feed operation or an enlargement operation in rapid succession.

In addition, while a separate management file is needed if the display VGA image and the main image are prepared as different files, the VGA image is recorded in the same file as the main image as shown in FIG. 4 in the embodiment, achieving an advantage of eliminating the need for a special management file.

For instance, in a 3.3 million pixel class electronic camera, a full-size image constituted of 2048×1530 pixels, an XGA image constituted of 1024×768 pixels and a VGA image constituted of 640×480 pixels are obtained through a photographing operation. While the volume of the full-size image recorded without compression can be as much as 10 MB, the data volume can be reduced through JPEG compression to ¼, ⅛ or 1/16 depending upon the compression rate. Since the VGA compliant resolution is normally adopted at the display monitor 3, display VGA image data may be prepared for full-size main image data and XGA main image data and VGA main image may be reproduced and displayed by using the corresponding main image data in response to a reproduction operation. It goes without saying that display VGA images corresponding to the display monitor resolution may be prepared for all the main images, i.e., the full-size main image, the XGA main image and the VGA main image, instead.

It is to be noted that while an explanation is given above in reference to the embodiment on an example in which still images are displayed, the present invention may be adopted in a similar manner in conjunction with dynamic images. For instance, a display image and a thumbnail image may be prepared based upon a first still image among a plurality of still images constituting a dynamic image to be recorded into the memory card 208 together with the dynamic image, i.e., the main image. Then, the dynamic image may be represented by the thumbnail image during the thumbnail group display shown in FIG. 6A so that the display image alone is displayed at the display monitor 3 once the dynamic image is selected and the main image read can be carried out in the background. When a dynamic image reproduction operation is subsequently performed, dynamic image display starts upon the completion of the main image read. It is to be noted that since a dynamic image constituted of images with a smaller number of pixels than the number of pixels corresponding to the VGA compliant resolution of the display monitor 3, e.g., images with only ¼ the number of pixels corresponding to VGA, is photographed and displayed, the display image in this case is an image with ¼ the VGA pixels.

In addition, while an explanation is given above in reference to the embodiment on an example in which images are reproduced on the display monitor 3 of the electronic camera the present invention is not limited to this example. For instance, it may be adopted when reproducing on a personal computer or the like image data having been recorded in a memory card or the like of an electronic camera. The present invention may be also adopted in a dedicated apparatus that prints image data recorded in a memory card or the like or other types of image processing apparatuses. It may be also adopted when reading image data into a personal computer via the Internet. It may be adopted in an information terminal apparatus including a personal computer, a cellular phone or the like mounted with a CCD camera.

Figure 8:
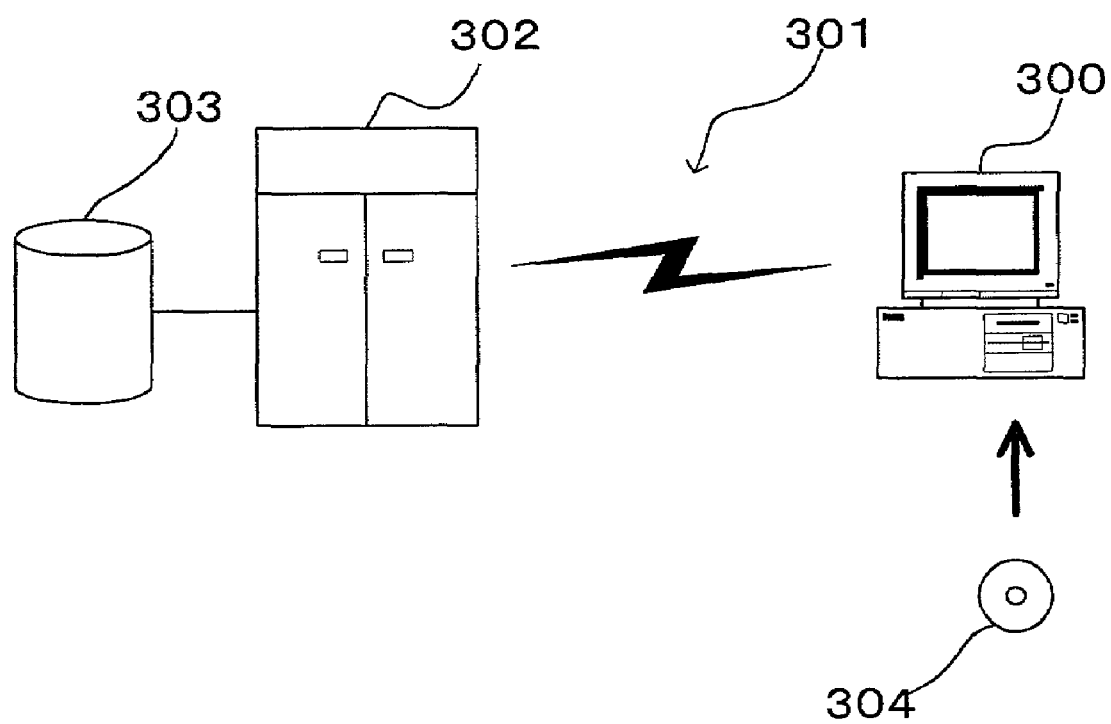
FIG. 8 illustrates how a control program may be provided through the Internet or via a recording medium.

In order to implement the processing on a personal computer or another type of image processing apparatus, a program of the control achieved in the electronic camera explained above is provided to a personal computer or the like in a CD-ROM or any other type of recording medium. Alternatively, it maybe provided via the Internet or the like. FIG. 8 illustrates how this may be realized. A personal computer 300 executes the program for implementing the control described earlier. The computer 300 is capable of connecting with a communication line 301. In a computer 302, i.e., a server computer which provides the control program, the control program is stored in a recording medium such as a hard disk 303. The communication line 301 may be a communication line for Internet communication or for personal computer communication, or it may be a dedicated communication line. The computer 302 reads out the control program from the hard disk 303 and transmits the control program to the personal computer 300 via the communication line 301. The control program may be provided in a recording medium such as a CD-ROM 304 or the like.

What is claimed is:

1. An electronic camera, comprising:
   an image-capturing device that captures an image of a subject and generates first image data;
   a display device that displays an image;
   a display image generating device that generates second image data, which have a smaller number of pixels than the first image data and correspond to a display resolution at the display device, based upon the first image data;
   a recording device that records the first image data and the second image data into a recording medium; and
   a control device that first reads the second image data when reading the first data from the recording medium, and displays on the display device an image based upon the second image data which have been read; and
   an enlargement instruction device that issues an instruction for enlarged display of the image that is being displayed at the display device based upon the second image data, wherein:
   the control device performs the enlarged display of the image that is being displayed at the display device based upon the second image data, by using the first image data which have been read.

2. An electronic camera according to claim 1, further comprising:
   a reproduction instruction device that issues an instruction to reproduce an image based upon image data recorded in the recording medium, wherein:
   the control device starts reading the second image data and the first image data recorded in the recording medium in response to a reproduction instruction issued by the reproduction instruction device.

3. An electronic camera according to claim 1, wherein: the recording device records the first image data and the second image data in a single image file in the recording medium.

4. An electronic camera according to claim 1, further comprising:
   a thumbnail image generating device that generates thumbnail image data, which have a smaller number of pixels than the second image data, based upon the first image data, wherein:
   the recording device records the first image data, the second image data, and the thumbnail image data into the recording medium.

5. An electronic camera according to claim 4, wherein:
   the control device displays a plurality of thumbnail images at the display device by reading a plurality of sets of thumbnail image data recorded in the recording medium, reads second image data before reading first image data corresponding to a thumbnail image selected from the plurality of thumbnail images on display and displays an image at the display device based upon the second image data having been read.

6. An electronic camera according to claim 1, wherein the control device invalidates the instruction for the enlarged display issued by the enlargement instruction device while reading the first image data is in progress.

7. An image processing apparatus, comprising:
   an image-capturing device that captures an image of a subject and generates first image data;
   a display device that displays an image;
   a display image generating device that generates second image data, which have a smaller number of pixels than the first image data and correspond to a display resolution at the display device, based upon the first image data;
   a recording device that records the first image data and the second image data into a recording medium; and
   a control device that first reads the second image data when reading the first data from the recording medium, and displays on the display device an image based upon the second image data which have been read; and
   an enlargement instruction device that issues an instruction for enlarged display of the image that is being displayed at the display device based upon the second image data, wherein:
   the control device performs the enlarged display of the image that is being displayed at the display device based upon the second image data, by using the first image data which have been read.

8. An image reproduction method, comprising:
   a step in which first image data are generated by engaging an image-capturing device to capture an image of a subject;
   a step in which second image data, which have a smaller number of pixels than the first image data and correspond to a display resolution at a display device, are generated based upon the first image data;
   a step in which the first image data and the second image data are recorded into a recording medium;
   a step in which the second image data are first read when reading the first image data from the recording medium and an image based upon the second image data that have been read is displayed at the display device; and
   a step in which an instruction is issued for enlarged display of the image that is being displayed at the display device based upon the second image data, wherein:

the enlarged display of the image that is being displayed at the display device is based upon the second image data, by using the first image data which have been read.

9. An image reproduction method for reproducing an image by reading image data from a recording medium having recorded therein first image data generated by engaging an image-capturing device to capture an image of a subject and second image data that have a smaller number of pixels than the first image data, correspond to a display resolution at a display device and are generated based upon the first image data, comprising:

a step in which the second image data are first read when reading the first image data from the recording medium and an image based upon the second image data that have been read is displayed at the display device; and a step in which an instruction is issued for enlarged display of the image that is being displayed at the display device based upon the second image data, wherein:

the enlarged display of the image that is being displayed at the display device is based upon the second image data, by using the first image data which have been read.

10. An electronic camera, comprising:

an image-capturing device that captures an image of a subject and generates first image data;

a display device that displays an image;

a display image generating device that generates second image data, which have a smaller number of pixels than the first image data and correspond to a display resolution at the display device, based upon the first image data;

a thumbnail image generating device that generates thumbnail image data, which have a smaller number of pixels than the second image data, based upon the first image data, a recording device that records the first image data, the second image data and the thumbnail image data into a recording medium; and a control device that displays a plurality of thumbnail images at the display device by reading a plurality of sets of thumbnail image data recorded in the recording medium, reads second image data before reading first image data corresponding to a thumbnail image selected from the plurality of thumbnail images on display and displays an image at the display device based upon the second image data having been read.

11. An electronic camera according to claim 10, further comprising:

an enlargement instruction device that issues an instruction for enlarged display of the image that is being displayed at the display device based upon the second image data, wherein the control device performs the enlarged display of the image that is being displayed at the display device based upon the second image data, by using the first image data which have been read.

12. An electronic camera according to claim 11, wherein the control device invalidates the instruction for the enlarged display issued by the enlargement instruction device while reading the first image data is in progress.

* * * * *